United States Patent
Jin (10) Patent No.: US 8,543,163 B2
(45) Date of Patent: Sep. 24, 2013

(54) SIGNAL ENHANCER CHIP FOR RADIO FREQUENCY IDENTIFICATION SYSTEM AND A SIGNAL ENHANCER

(75) Inventor: Kewei Jin, Shanghai (CN)

(73) Assignee: Shanghai Quanray Electronics Co., Ltd (CN)

( * ) Notice: Subject to any disclaimer, the term of this patent is extended or adjusted under 35 U.S.C. 154(b) by 366 days.

(21) Appl. No.: 12/937,438

(22) PCT Filed: Apr. 17, 2009

(86) PCT No.: PCT/CN2009/071326
§ 371 (c)(1), (2), (4) Date: Oct. 12, 2010

(87) PCT Pub. No.: WO2009/127158
PCT Pub. Date: Oct. 22, 2009

(65) Prior Publication Data
US 2011/0039601 A1   Feb. 17, 2011

(30) Foreign Application Priority Data

Apr. 18, 2008 (CN) .......................... 2008 1 0036254

(51) Int. Cl.
*H04B 1/38* (2006.01)
(52) U.S. Cl.
USPC .......... 455/558; 455/73; 455/560; 455/550.1; 455/556.1; 455/419; 455/552.1; 455/553.1; 455/411; 455/41.2; 235/439; 235/441; 235/492; 235/451; 235/380; 235/486; 235/435; 235/472.02; 235/375; 235/376
(58) Field of Classification Search
USPC ............. 455/558, 73, 560, 550.1, 556.1, 419, 455/552.1, 553.1, 411, 41.2, 456.1, 551, 455/41.1; 235/439, 441, 492, 451, 380, 486, 235/435, 472.02, 375, 376
See application file for complete search history.

(56) References Cited

U.S. PATENT DOCUMENTS 5,930,304 A * 7/1999 Hollenbeck et al. .......... 375/316
6,213,402 B1 * 4/2001 Reiner .......................... 235/492
(Continued)

FOREIGN PATENT DOCUMENTS

CN  101303744 A  11/2008
EP  1385120 A1  1/2004
(Continued)

OTHER PUBLICATIONS

International Search Report PCT/CN2009/071326; Dated Jul. 23, 2009.

*Primary Examiner* — Andrew Wendell
*Assistant Examiner* — Ganiyu A Hanidu
(74) *Attorney, Agent, or Firm* — Cantor Colburn LLP (57) ABSTRACT

A signal enhancer chip for a radio frequency identification system and a signal enhancer are disclosed. The signal enhancer chip includes: a receiving circuit, a sending circuit and a power supply module. The receiving circuit comprises a demodulation amplification module and a digital quantizing module. The sending circuit comprises a logic control module and a modulation module. The demodulation amplification module is for amplifying and demodulating the received communication signal sent by a dual interface SIM card. The digital quantizing module converts an analog communication signal output from the demodulation amplification module to the digital communication signal. The logic control module processes the digital communication signal output from the digital quantizing module and generates a subsidiary carrier wave signal necessary for returning to a reader. The modulation module generates a communication signal to be sent according to the subsidiary carrier wave signal. The signal enhancer and chip, as the trunk device between the dual interface SIM card and the reader, can enhance the acknowledge signal of the dual interface SIM card and ensure the normal communication between the dual interface SIM card and the reader.

10 Claims, 5 Drawing Sheets

(56) References Cited

U.S. PATENT DOCUMENTS

| | | | |
|---|---|---|---|
| 7,757,958 B2 * | 7/2010 | Ito | 235/492 |
| 7,762,470 B2 * | 7/2010 | Finn et al. | 235/492 |
| 2005/0224589 A1 * | 10/2005 | Park et al. | 235/492 |
| 2007/0229281 A1 * | 10/2007 | Shionoiri et al. | 340/572.7 |
| 2007/0274242 A1 * | 11/2007 | Lamacraft et al. | 370/310 |

FOREIGN PATENT DOCUMENTS

| | | |
|---|---|---|
| JP | 2007241940 A | 9/2007 |
| KR | 1020070044639 A | 4/2007 |
| WO | 2007108371 A1 | 9/2007 |

* cited by examiner

PRIOR ART

SIGNAL ENHANCER CHIP FOR RADIO FREQUENCY IDENTIFICATION SYSTEM AND A SIGNAL ENHANCER

CROSS REFERENCE TO RELATED APPLICATIONS

The present application claims the priority of Chinese Patent Application No. 200810036254.3, entitled "A signal enhancer chip for radio frequency identification system and a signal enhancer", and filed Apr. 18, 2008, the entire disclosure of which is incorporated herein by reference.

FIELD OF THE INVENTION

The present invention relates to radio frequency identification technology, and particularly relates to a signal enhancer chip for radio frequency identification system and a signal enhancer.

BACKGROUND OF THE INVENTION

After more than ten years development, radio frequency identification (RFID) technology which includes Integrated Circuit Card (IC), is now widespread used in modern daily life, for example, public transport system, entrance guard system, small electronic payment, and so forth. Radio frequency identification technology is one kind of automatic identification technology, which at least includes a tag and a reader. The tag is for storing electronic data in a determined format. In practice, the tag is usually attached on the surface of an object to be identified. The reader is also known as a readout, and is adapted for reading and identifying the electronic data stored in the tag without contacting the tag, thereby accomplishing the aim of identifying objects automatically. Furthermore, computers and computer networks are used to collect, process and transfer the identification information. Most RFID systems work under a fixed frequency and a set of standard protocols.

Digital modulation techniques are widely used in RFID, such as Amplitude Shift Keying (ASK), Frequency Shift Keying (FSK) and Phase Shift Keying (PSK) modulation. ASK means that carrier amplitudes are defined as different values according to the modulation of digital data, for example, the carrier amplitude is "0" if the digital data is "0" in binary, and the carrier amplitude is "1" if the digital data is "1" in binary. Amplitude shifting is easy to implement, but it is susceptible to gain change. FSK means modulating carrier frequencies according to the digital data ("0" or "1"). For example, the carrier frequency is F1 if the digital data is "0" in binary, and the carrier frequency is F2 if the digital data is "1" in binary. FSK is good at anti-jamming, but needs to occupy a large bandwidth. PSK means modulating carrier phases according to the digital data. For example, the 180 phase shift represents "1", while 0 phase shift represents "0". PSK is best at anti-jamming, and the phase shift can be used as timing information to synchronize the clock of the sender and the receiver, and to speed up the data transferring. ASK, FSK and PSK are existing mature technologies and widely used in various communication systems.

Recently, with the development of rail transport, logistics management, goods security and individual identification, RFID technology has made great progress, and all kinds of RFID tags and identifying devices are needed. Usually, there is an electronic wallet in a tag and a cardholder needs to deposit some money in the tag. When a transaction occurs, the required money is deducted from the tag. But there are some drawbacks of a single function tag. For example, the cardholder has to go to a required place to deposit money, large transactions could not be protected by setting password, the RFID payment could not be combined with the mobile payment, and so on.

Meanwhile, after twenty years development, mobile communication terminal has become a necessary portable device almost by every consumer. Moreover, there is a trend that more functions would be integrated in a mobile communication terminal. It is common to utilize mobile phone networks to pay, such as GSM, CDMA. But how to combine mobile phones with tags and enable mobile phones to be used conveniently just like a bus card is a trend nowadays, and many equipment suppliers and mobile operators are trying to develop market in this field.

Being affected by the mobile phone payment in Japan and Korea, many operators have been expected to enter the field of small electronic payment. Non-contact proximity Radio Frequency Identification can provide effective solutions for real-time payment and on-site payment, and is considered to bring great opportunities to the mobile payment industry which is developing slowly at present. While a multi-purpose machine or a multi-purpose card which can combine mobile terminal and RFID technology is new trend in the next decade. Especially in the 3G era, RFID readers which can provide wireless-connectivity function and non-contact RFID are given priority. At present, there are two kinds of solutions for non-contact technology: Combi SIM card and Near Field Communication (NFC).

Combi SIM card is also known as dual interface SIM card, which means substituting a mobile phone inside SIM card with a Combi SIM card, and adding a non-contact IC card interface to the original contact SIM card. There are two typical solutions. One is printing the non-contact antenna of the non-contact IC card on a plastic film, and then pasting the plastic film onto the SIM card. The other one is the non-contact antenna of the non-contact IC card working as an independent component attached to front or rear of the mobile phone, and connected to the C4 and C8 interfaces which is not used yet. But there are some drawbacks for these two solutions. The antenna is easy to break when it is pasted to the SIM card or connected to the C4 or C8 interface. Furthermore, signals received by the dual interface SIM card or signals returned to the reader are extremely weak because of the shielding effect caused by the battery and the circuit board. Therefore, the communication quality between the dual interface SIM card and the reader is poor, and the reader almost can not receive the acknowledge signals from the dual interface SIM card.

NFC is a new solution about RFID technology provided by Nokia, Philips, and so on. The basic principle is to add a new RFID module adapted for payment to a redesigned mobile phone. The new RFID module communicates with the redesigned mobile phone according to a predetermined protocol. The drawback is that the consumers have to reform the mobile phones or buy a new mobile phone. This is not accepted by all consumers at the present and it is a great waste of resources.

Figure 1:
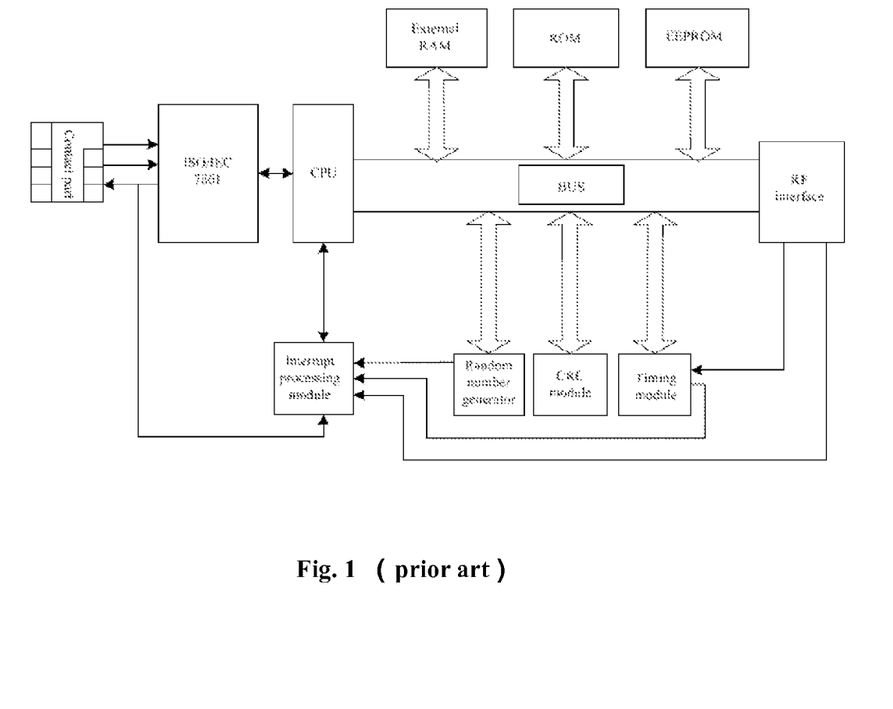
FIG. 1 shows a schematic diagram of the structure of a typical dual interface IC card in prior art.
Figure 2:
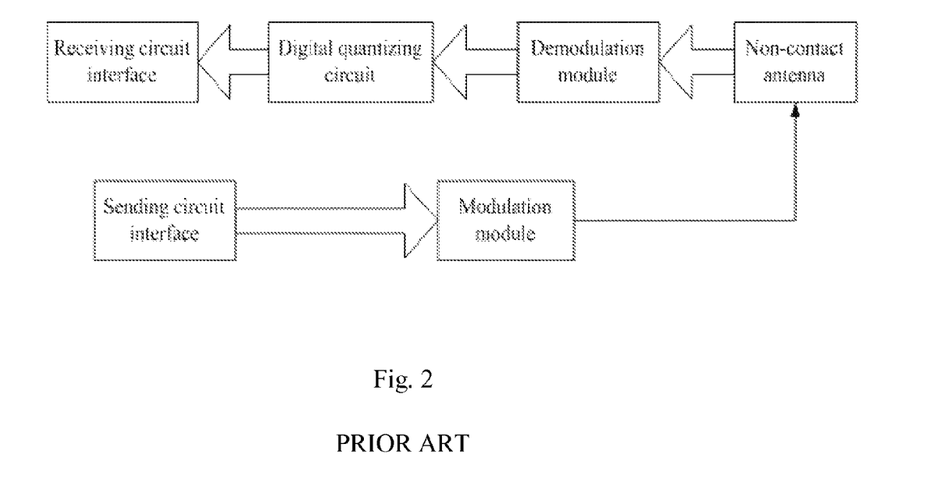
FIG. 2 shows a schematic diagram of the RF interface circuit of a typical dual interface IC card in prior art.

FIG. 1 shows a schematic diagram of the structure of a typical dual interface IC card in prior art, and FIG. 2 shows a schematic diagram of the RF interface circuit of a typical dual interface IC card in prior art. Referring to FIG. 1, it is provided by Gemplus. The contact part works according to the ISO/IEEC 7861 standard protocol, while the non-contact part works according to the ISO/IEEC 14443 TYPEA/TYPEB standard protocol. The dual interface IC card comprises: a Radio Frequency (RF) interface, a Central Processing Unit (CPU), an interrupt processing module, a random number generator, a read-only memory (ROM), an EEPROM, an external RAM, a Cyclic Redundancy Check (CRC) module, a timing module and a ISO/IEEC 7816 module. The RF interface is the communication interface between the dual interface IC card and a reader whose frequency is 13.56 MHz. CPU works as the central processing unit, and finishes the communication and transaction with the reader, together with the internal software. The interrupt processing module handles various interrupts generated by peripherals. The ROM stores the internal firmware program. The EEPROM and external RAM store data of the dual interface IC card and intermediate variables. The CRC module generates cyclic redundancy check code and ensures the data integrity in communication. The timing module provides an internal clock for the inside modules. The ISO/IEEC 7816 module is the communication interface between the mobile phone and the dual interface IC card, and is the channel through which the mobile phone supplies power for the dual interface IC card.

Referring to FIG. 2, the RF interface comprises: a non-contact antenna whose frequency is 13.56 MHz, a demodulation circuit, a digital quantizing circuit and a modulation circuit.

The signals sending from the reader to the dual interface IC card, which are 100% ASK modulation signals, are received by the non-contact antenna. The demodulation circuit in the dual interface IC card demodulates the signals by the way of diode peak envelope demodulation. The demodulated signals are transferred to the digital quantizing circuit for quantification process, and then generating baseband signals. The baseband signals are transferred to the CPU for processing.

Before the CPU sends acknowledge signals to the reader, the CPU completes coding first, and then sends them to the modulating circuit for modulating. After that, the acknowledge signals are transmitted by adjusting the resistors in the modulation circuit of the RF interface.

Because of the shielding effect of the battery and the circuit board in the mobile phone, if the dual interface IC card is applied in the mobile phone instead of the internal SIM card, the dual interface IC card can not reliably receive the command sent form the reader. Meanwhile, because the acknowledge signals are attenuated significantly, the reader can not receive and distinguish the acknowledge signals sent from the dual interface IC card.

SUMMARY OF THE INVENTION

An object of the present invention is to solve this problem that the communication quality between the dual interface SIM card and the mobile phone is poor, when a dual interface SIM card is used in a mobile phone.

To achieve the project, the present invention provides a signal enhancer chip for radio frequency identification system, which comprises a receiving circuit, a sending circuit and a power supply module. The receiving circuit comprises a demodulation amplification module and a digital quantizing module. The sending circuit comprises a logic control module and a modulation module. The demodulation amplification module is for amplifying and demodulating the communication signal received from a dual interface SIM card, and then outputting an analog communication signal. The digital quantizing module is for converting the analog communication signal to a digital communication signal. The logic control module is for processing the digital communication signal received from the digital quantizing module and generating a subsidiary carrier wave signal necessary for returning to a reader. The modulation module is for generating a communication signal to be sent according to the subsidiary carrier wave signal.

To achieve the project, the present invention further provides a signal enhancer which comprises the signal enhancer chip described above.

Compared with the prior art, the advantages of the present invention are as follows. The signal enhancer and signal enhancer chip, receive and enhance the communication signal received from the dual interface SIM card, and then send an amplified communication signal to the reader, thereby improving the problem that the communication signal output by the dual interface SIM card will be attenuated because of the shielding of mobile phone battery and circuit board, and ensuring that the reader can get a strong communication signal.

DETAILED DESCRIPTION OF THE EMBODIMENTS

In order to illustrate the technical content, structure features and effect of the present invention clearly, a detailed description of the preferred embodiments are as follows.

The inventors find that in a radio frequency identification system having a dual interface SIM card, a communication signal output by the dual interface SIM card 10 will be attenuated seriously because of the shielding of mobile phone battery and circuit board. If the communication signal is not enhanced by a signal enhancer, a reader 1 can not receive the communication signal, and the communication between the reader and the dual interface SIM card 10 will lose.

In order to solve this problem, the present invention provides a signal enhancer set between the dual interface SIM card 10 and the reader 1, and adapted for amplifying the communication signal.

Figure 3:
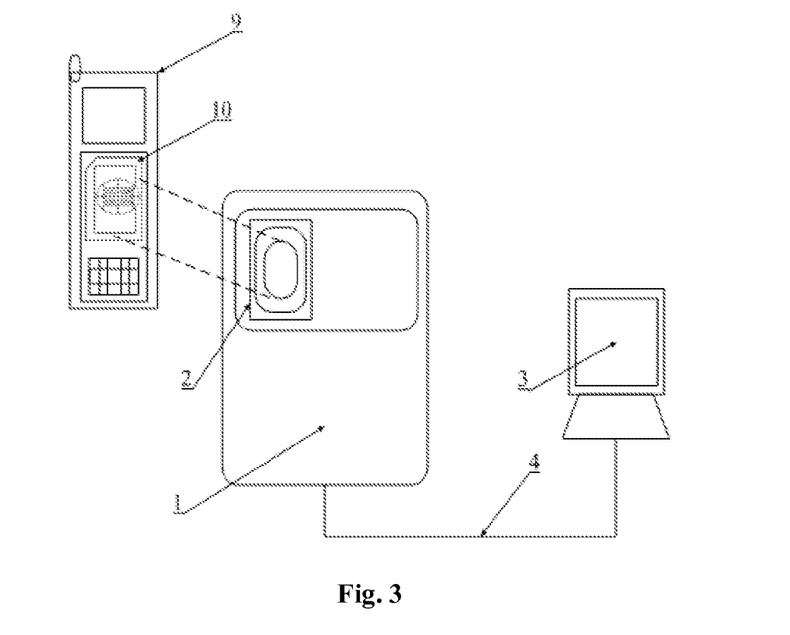
FIG. 3 shows a schematic diagram of a radio frequency identification system with a signal enhancer according to the present invention.

FIG. 3 shows a schematic diagram of a radio frequency identification system with a signal enhancer according to the present invention. Referring to FIG. 3, the radio frequency identification system includes: the reader 1, a background system 3, a first communication interface 4, a mobile communication device 9, the dual interface SIM card 10 and a signal enhancer 2. The first communication interface 4 is adapted for connecting the reader 1 and the background system 3. The dual interface SIM card 10 is set in the mobile communication device 9 (such as a mobile phone). The signal enhancer 2 is set in the reader 1 or in the mobile communication device 9, and adapted for amplifying an acknowledge signal received from the dual interface SIM card 10 and transferred to the reader 1.

In the radio frequency identification system, the reader 1 is adapted for sending a transaction command and receiving the acknowledge signal. The dual interface SIM card 10 is adapted for receiving the transaction command and sending the acknowledge signal. The signal enhancer 2 is set between the reader 1 and the dual interface SIM card 10 and adapted for amplifying the communication signals. Specifically, the signal sent from the reader 1 is directly transferred to the dual interface SIM card 10, while the acknowledge signal sent from the dual interface SIM card 10 is modulated by ASK, FSK or PSK, and then transferred to the signal enhancer 2, where the acknowledge signal is amplified. After that, the amplified acknowledge signal is transferred to the reader 1.

The signal enhancer 2 is set in the reader 1 or in the mobile communication device 9, and adapted for amplifying the acknowledge signal which is output by the dual interface SIM card 10 and transferred to the reader 1.

Figure 4:
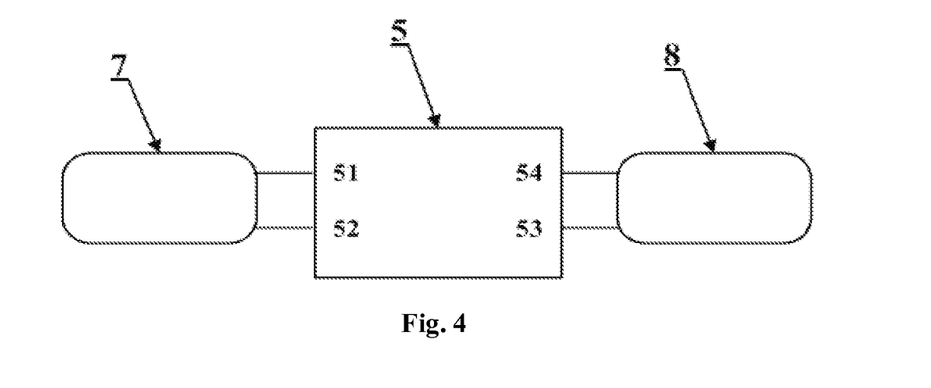
FIG. 4 shows a schematic diagram of a signal enhancer according to the present invention.
Figure 5:
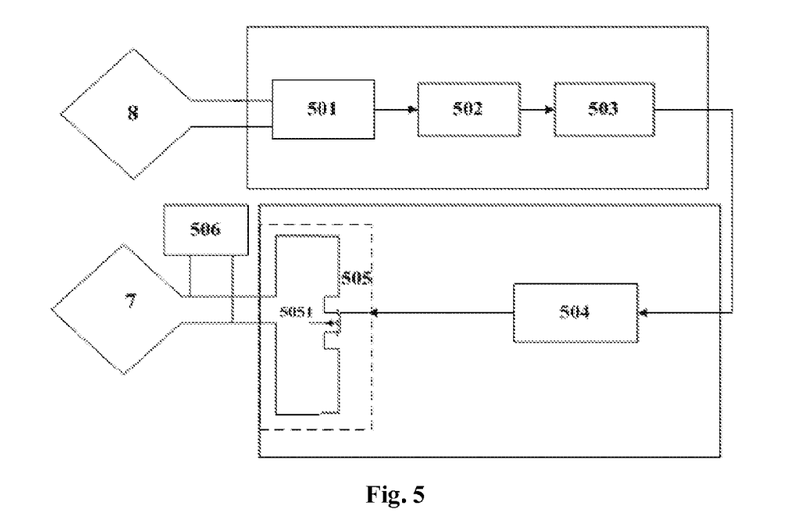
FIG. 5 shows a schematic diagram of the circuit of a signal enhancer according to the present invention.

FIG. 4 shows a schematic diagram of a signal enhancer according to the present invention. FIG. 5 shows a schematic diagram of the circuit of a signal enhancer according to the present invention. As shown in FIG. 4, the signal enhancer 2 sends and receives signals with two antennas. Specifically, the signal enhancer includes a receiving antenna 8, a sending antenna 7 and a signal enhancer chip 5. The receiving antenna 8 is adapted for communicating between the signal enhancer 2 and the dual interface SIM card 10. The signal enhancer chip 5 is adapted for amplifying the acknowledge signal received by the receiving antenna 8. The sending antenna 7 is adapted for communicating between the signal enhancer 2 and the reader 1. The signal enhancer chip 5 includes a first antenna pin 51, a second antenna pin 52, a third antenna pin 53 and a fourth antenna pin 54.

The sending antenna 7 is connected to the first antenna pin 51 and the second antenna pin 52 which are provided on the signal enhancer chip 5. The receiving antenna 8 is connected to the third antenna pin 53 and the fourth antenna pin 54 which are provided on the signal enhancer chip 5.

The signal sent from the reader 1 is directly received by the dual interface SIM card 10 provided in the mobile communication device 9, while the acknowledge signal sent from the dual interface SIM card 10 is first received by the receiving antenna 8, and then amplified by the signal enhancer chip 5. After that, the amplified acknowledge signal is transferred to the reader 1 by the sending antenna 7 according to the same frequency and protocol with the reader 1.

In a radio frequency identification system, the communication signal between the dual interface SIM card 10 and the signal enhancer 2 is modulated by ASK, FSK, or PSK, and the frequency of the carrier wave is 6.78 MHz, 13.56 MHz or 27.12 MHz. The acknowledge signal sent from the signal enhancer 2 to the reader 1 has the same frequency and protocol with the reader 1. The standard protocol is ISO/IEC 14443, ISO/IEC 15693, or ISO 11784/ISO 11785.

When the signal enhancer 2 works, it acquires energy of carrier waves which are sent from the reader 1 through the sending antenna 7.

Referring to FIG. 5, the signal enhancer chip 5 further includes a receiving circuit, a sending circuit and a power supply module 506. The receiving circuit includes a filter 501, a demodulation amplification module 502 and a digital quantizing module 503. The sending circuit includes a logic control module 504 and a modulation module 505.

The receiving antenna 8 transfers the communication signal, which is sent from the dual interface SIM card 10 to the signal enhancer 2, to the input end of the filter 501, and then a clean signal is output by the filter 501 to be demodulated.

The filter 501 comprises a band-pass filter and a band-stop filter. The band-pass filter is adapted for filtering the modulation wave signal and carrier wave signal which is sent form the dual interface SIM card 10 to the signal enhancer 2. The band-stop filter is adapted for filtering the modulation wave signal and carrier wave signal which is sent form the reader 1 to the signal enhancer 2. The central frequency of the band-pass filter and the band-stop filter is the same with the frequency of the signal enhancer 2 or with the frequency of the carrier wave signal which is sent from the reader 1 to the signal enhancer 2. The frequency of the carrier wave signal is determined by communication standard protocols adopted by the signal enhancer chip 5. Specifically, when ISO/IEC 14443 or ISO/IEC 15693 is adopted, the frequency of the carrier wave is 13.56 MHz. When ISO 11784/ISO 11785 is adopted, the frequency of the carrier wave is 100 K to 150 KHz, such as 134.2 KHz. The band-pass filter and band-stop filter in the filter 501 is Chebyshev Filter or some other filters.

The output end of the filter 501 is connected to the input end of the demodulation amplification module 502. The demodulation amplification module 502 includes a demodulation circuit and an amplifier circuit. The demodulation amplification module 502 is adapted for amplifying and demodulating the signal output by the filter 501.

Figure 7:
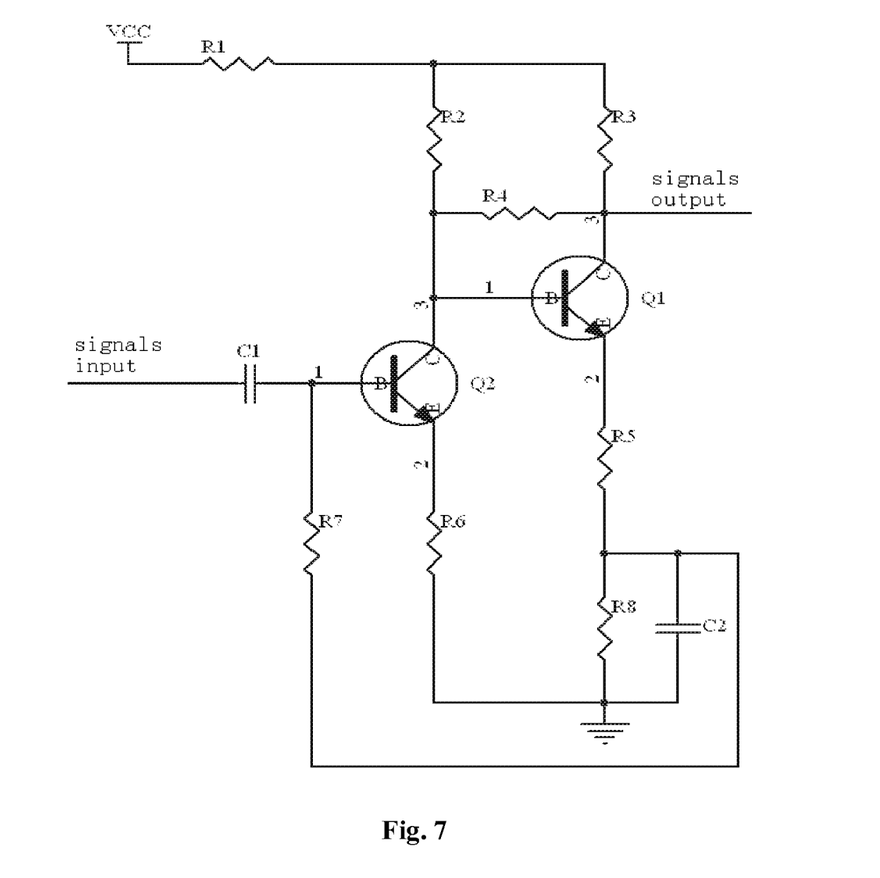
FIG. 7 shows a schematic diagram of an amplifier circuit adapted for the demodulation amplification module in FIG. 5.

FIG. 7 shows a schematic diagram of an amplifier circuit adapted for the demodulation amplification module. Referring to FIG. 7, the amplifier circuit includes: a first PNP transistor Q1, a second PNP transistor Q2, a first capacitor C1, a second capacitor C2, and resistors R1 to R8.

The amplifier circuit is a common-emitter circuit. The emitter electrodes of the first PNP transistor Q1 and the second PNP transistor Q2 are connected to ground. The base electrode of the second PNP transistor Q2 works as the input of communication signals. The collector electrode of the first PNP transistor Q1 works as the output.

After being amplified by the described amplifier circuit, the communication signals will be transferred to the demodulation circuit to be demodulated.

The demodulation amplification module 502 adopts a coherent demodulation method or a non-coherent demodulation method, but is not be limited thereto. For example, as for the non-coherent demodulation method, a diode peak envelope demodulation or an average envelope demodulation can be adopted.

Figure 6A:
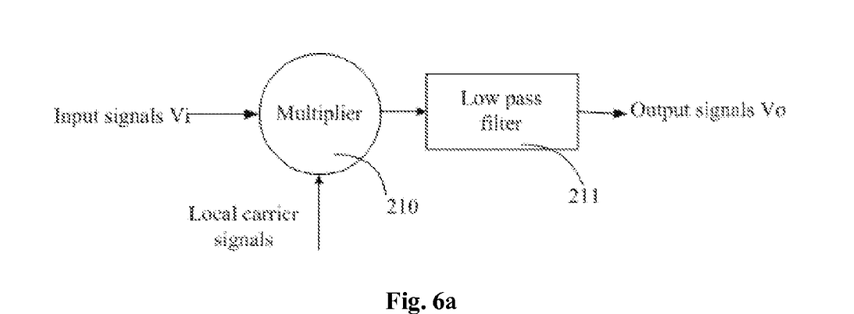
FIG. 6a shows a schematic diagram of a coherent demodulation circuit adapted for the demodulation amplification module in FIG. 5.

FIG. 6a shows a schematic diagram of a coherent demodulation circuit adapted for the demodulation amplification module. The coherent demodulation circuit includes: a multiplier 210, a low-pass filter 211, an input signal Vi which has been filtered and amplified by the filter 501. The input signal Vi together with the local carrier wave signals are multiplied by the multiplier 210, and then transferred into the low-pass filter 211. After being filtered by the low-pass filter 211, an output signal Vo is output.

Figure 6B:
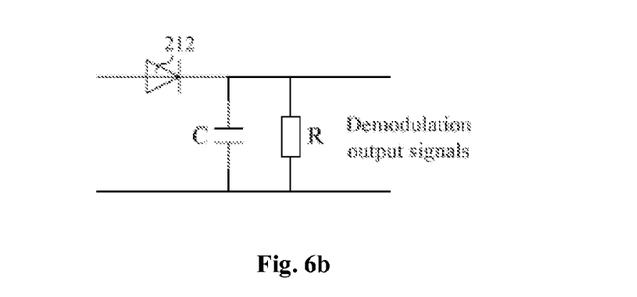
FIG. 6b shows a schematic diagram of a diode peak envelope demodulation of the non-coherent demodulation circuit adapted for the demodulation amplification module in FIG. 5.

FIG. 6b shows a schematic diagram of a diode peak envelope demodulation of the non-coherent demodulation circuit adapted for the demodulation amplification module. The non-coherent demodulation circuit includes: a detector diode 212, a capacitor C, and a resistor R. The capacitor C and resistor R are parallel and are connected to the negative electrode of the detector diode 212. The input signal Vi will be transformed into an output signal Vo after being demodulated by the diode peak envelope demodulation circuit.

After being demodulated and processed by the demodulation amplification module 502, an analog communication signal is transferred to the digital quantizing module 503. In this embodiment, the digital quantizing module 503 is an analog-digital converter (ADC) or a comparator. It transforms the analog communication signal into a digital communication signal, and then transfers the digital communication signal to the input end of the logic control module 504.

The logic control module 504 is adapted for processing the digital communication signal which is sent from the digital quantizing module 503. It can execute a corresponding logical control according to the standard protocol adopted by the system, such as ISO/IEC 14443, ISO/IEC 15693 or ISO 11784/ISO 11785, and then generate a subsidiary carrier wave signal necessary for returning to the reader. The subsidiary carrier wave signal is transferred to the input end of the modulation module 505.

The subsidiary carrier wave signal generated by the logic control module 504 is corresponding to the standard protocol adopted by the enhancer chip 5, such as ISO/IEC 14443, ISO/IEC 15693 or ISO 11784/ISO 11785. If the ISO/IEC 14443 is adopted, the frequency of the subsidiary carrier wave signal is 847 kHz. If the ISO/IEC 15693 is adopted, the frequency of the subsidiary carrier wave signal is 423.75 kHz or 484.28 kHz.

The modulation module 505 is adapted for generating a communication signal to be sent according to the subsidiary carrier wave signal. The modulation module 505 is a reflex modulation circuit or a load modulation circuit but will not be limited thereto. As for a load modulation circuit, a modulated signal is generated by modulating one or more subsidiary carrier wave signals. The amount and frequency of the subsidiary carrier wave signals are determined by the standard protocol adopted by the system.

The modulation module 505 generates a high voltage or a low voltage to control an insulated gate field effect transistor (MOS transistor) switch 5050 which is connected to the sending antenna 7, thereby changing a load current in the sending antenna 7, and generating a subsidiary carrier modulation signal for returning to the reader 1. When the modulation module 505 generates a high voltage, the MOS transistor switch 5050 is activated, there is a load current formed in the sending antenna 7, and a subsidiary carrier modulation signal is returned to the reader 1. When the modulation module 505 generates a low voltage, the MOS transistor switch 5050 is not activated, there is not a load current formed in the sending antenna 7, and a subsidiary carrier modulation signal is not returned to the reader 1. After that, the reader 1 demodulate the subsidiary carrier modulation signal and get the acknowledge signal sent form the dual interface SIM card 10.

The signal enhancer chip 5 directly acquires the carrier wave energy sent form the reader 1 through the sending antenna 7. The power supply module 506 supplies the signal enhancer chip 5 power through a bridge rectifier circuit.

The sending antenna 7 not only works as the communication channel between the reader 1 and the signal enhancer 2, but also transfers the carrier wave energy from the reader 1 to the power supply module 506 on the signal enhancer 2. Therefore, the signal enhancer 2 can work without external AC or DC power supply.

In order to resolve the signal attenuation problem described above, the signal enhancer 2 in the present invention utilizes the modules in the signal enhancer chip 5 to amplify the communication signals. It does not need to reform the mobile communication device 9. Furthermore, the present invention expands the application of the communication system, and reduces the capital and time cost.

Although the present invention has been disclosed as above with reference to preferred embodiments thereof but will not be limited thereto. Those skilled in the art can modify and vary the embodiments without departing from the spirit and scope of the present invention. Accordingly, the scope of the present invention shall be defined in the appended claims.

What is claimed is:

1. A signal enhancer chip for a radio frequency identification system, comprising:
 a receiving circuit comprising a demodulation amplification module for amplifying and demodulating communication signals received from a dual interface SIM card, and then outputting an analog communication signal, and a digital quantizing module for converting the analog communication signal to a digital communication signal;
 a sending circuit comprising a logic control module for processing the digital communication signal received from the digital quantizing module and generating a subsidiary carrier wave signal necessary for returning to a reader, and a modulation module for generating a communication signal to be sent according to the subsidiary carrier wave signal;
 a power supply module; and
 a filter for filtering the communication signals received from the dual interface SIM card, and then outputting the communication signals to the demodulation amplification module;
 wherein the filter comprises:
 a band-pass filter for filtering modulation wave signals and carrier wave signals received from the dual interface SIM card; and
 a band-stop filter for filtering modulation wave signals and carrier wave signals sent from the reader;
 wherein the central frequency of the band-pass filter and the band-stop filter is the same with the frequency of the carrier wave signals sent from a signal enhancer or from the reader.

2. The signal enhancer chip according to claim 1, wherein the demodulation amplification module further comprises:
 a demodulation circuit for demodulating communication signals received from the dual interface SIM card; and
 an amplifier circuit for amplifying communication signals which has been demodulated by the demodulation circuit.

3. The signal enhancer chip according to claim 2, wherein the demodulation circuit performs a coherent demodulation or a non-coherent demodulation.

4. The signal enhancer chip according to claim 3, wherein the non-coherent demodulation is a diode peak envelope demodulation or an average envelope demodulation.

5. The signal enhancer chip according to claim 1, wherein the digital quantizing module is an analog-digital converter or a comparator.

6. The signal enhancer chip according to claim 1, wherein the modulation module comprises a control switch, when the control switch being activated, a load current being formed, and a subsidiary carrier modulation signal being generated and returned to the reader.

7. The signal enhancer chip according to claim 6, wherein the control switch is an insulated gate field effect transistor.

8. The signal enhancer chip according to claim 1, wherein the modulation module performs a reflex modulation or a load modulation.

9. The signal enhancer chip according to claim 1, wherein the power supply module comprises a bridge rectifier circuit.

10. A signal enhancer comprises a signal enhancer chip with reference to claim 1.

* * * * *